(12) United States Patent
Tabouret et al.

(10) Patent No.: US 10,961,951 B2
(45) Date of Patent: Mar. 30, 2021

(54) AXIAL ADJUSTMENT OF THE TRANSLATING COWL USING AN ECCENTRIC

(71) Applicant: Safran Nacelles, Gonfreville l'Orcher (FR)

(72) Inventors: Alexis Tabouret, Gonfreville l'Orcher (FR); Alexis Loncle, Gonfreville l'Orcher (FR)

(73) Assignee: SAFRAN NACELLES, Gonfreville l'Orcher (FR)

( * ) Notice: Subject to any disclaimer, the term of this patent is extended or adjusted under 35 U.S.C. 154(b) by 62 days.

(21) Appl. No.: 16/229,358

(22) Filed: Dec. 21, 2018

(65) Prior Publication Data

US 2019/0136796 A1   May 9, 2019

Related U.S. Application Data

(63) Continuation of application No. PCT/FR2017/051580, filed on Jun. 16, 2017.

(30) Foreign Application Priority Data

Jun. 21, 2016 (FR) ..................................... 16/55761

(51) Int. Cl.
*F02K 1/72* (2006.01)
*F02K 1/76* (2006.01)

(52) U.S. Cl.
CPC .................. *F02K 1/72* (2013.01); *F02K 1/76* (2013.01); *F02K 1/763* (2013.01); *F05D 2240/129* (2013.01)

(58) Field of Classification Search
CPC ..... F02K 1/70; F02K 1/72; F02K 1/62; F02K 1/625; F02K 1/763; F02K 1/09
See application file for complete search history.

(56) References Cited

U.S. PATENT DOCUMENTS

| 3,779,010 A | 12/1973 | Chamay et al. |
| 2015/0345423 A1* | 12/2015 | Hurlin ....................... F02K 1/18 239/265.19 |

(Continued)

FOREIGN PATENT DOCUMENTS

| EP | 1978232 | 10/2008 |
| FR | 2978800 | 2/2013 |

OTHER PUBLICATIONS

International Search Report for International Application PCT/FR2017/051580, dated Sep. 15, 2017.

*Primary Examiner* — Andrew H Nguyen
(74) *Attorney, Agent, or Firm* — Burris Law, PLLC

(57) ABSTRACT

Disclosed is a thrust reverser for a device receiving a propulsion element, such as a turbojet engine nacelle. The thrust reverser includes a stationary structure having a deflector deflecting at least a portion of the air flow that is to flow through the nacelle, a translatably movable cap that can be in a closed position in which the cap covers the deflector deflecting the air flow and an open position in which the cap opens the deflector deflecting the air flow, and at least one moving actuator configured to move the cap between the open and closed positions. The moving actuator includes a stationary portion designed to be attached to the stationary structure in a first securing position and a movable portion designed to be attached to the cap in a second securing position. An adjusting device adjusts the first securing position.

7 Claims, 5 Drawing Sheets

(56) References Cited

U.S. PATENT DOCUMENTS

2015/0377182 A1\* 12/2015 Bastide .................. F02K 1/766
                                                      239/265.19
2016/0131079 A1\* 5/2016 Todorovic ................ F02K 1/72
                                                      239/265.19

\* cited by examiner

AXIAL ADJUSTMENT OF THE TRANSLATING COWL USING AN ECCENTRIC

CROSS-REFERENCE TO RELATED APPLICATIONS

This application is a continuation of International Application No. PCT/FR2017/051580, filed on Jun. 16, 2017, which claims priority to and the benefit of FR 16/55761 filed on Jun. 21, 2016. The disclosures of the above applications are incorporated herein by reference.

FIELD

The present disclosure relates to a thrust reverser for a turbojet engine nacelle.

BACKGROUND

The statements in this section merely provide background information related to the present disclosure and may not constitute prior art.

An aircraft is moved by several turbojet engines each housed in a nacelle serving to channel the air flow generated by the turbojet engine which also accommodates a set of actuating devices ensuring various functions when the turbojet engine is in operation or at stop.

These actuating devices may comprise, in particular, a mechanical thrust reversal system.

A nacelle generally has a tubular structure comprising an air inlet upstream of the turbojet engine, a median portion intended to surround a fan of the turbojet engine, a downstream portion accommodating thrust reversal means and intended to surround the combustion chamber of the turbojet engine, and is generally terminated by an ejection nozzle whose outlet is located downstream of the turbojet engine.

Modern nacelles are intended to accommodate a bypass turbojet engine capable of generating via the blades of the fan, an air flow part of which, called hot or primary flow, circulates in the combustion chamber of the turbojet engine, and the other part of which, called cold or secondary air flow, circulates outside the turbojet engine through an annular passage, also called flow path, formed between a fairing of the turbojet engine and an inner wall of the nacelle. The two air flows are ejected from the turbojet engine by the rear of the nacelle.

The role of a thrust reverser is, during the landing of an aircraft, to improve the braking capacity thereof by redirecting forward at least part of the thrust generated by the turbojet engine. In this phase, the thrust reverser obstructs the flow path of the cold air flow and directs the latter forward of the nacelle, thereby generating a counter-thrust in addition to the braking of the aircraft wheels.

The means implemented to achieve this reorientation of the cold air flow vary depending on the type of thrust reverser. However, in all cases, the structure of a thrust reverser comprises movable cowls (or doors) displaceable between a closed or "direct jet" position in which they close this passage and an open or "reverse jet" position in which they open in the nacelle a passage intended for the diverted flow. These cowls can perform a diverting function of or simply activate other diverting means.

In the case of a cascade thrust reverser, also known as a cascade reverser, the reorientation of the air flow is performed by cascade vanes. These cascade vanes are mounted on a fixed structure of the nacelle, the cowl having only a simple slide function aiming at uncovering or covering again these cascade vanes.

The translation of the cowl is performed along a longitudinal axis substantially parallel to the axis of the nacelle. Thrust reverser flaps, actuated by the sliding of the cowl, allow an obstruction of the flow path of the cold air flow downstream of the cascade vanes, so as to optimize the reorientation of the cold air flow towards the outside of the nacelle.

Such a cowl may either:

have an almost annular shape, extending without interruption from one side to the other of a suspension mast of the assembly formed by the turbojet engine and its nacelle, such a cowl being called "O-duct," referring to the shroud shape of such a cowl, or actually comprise two half-cowls each extending over a semi-circumference of the nacelle, such a cowl being called "D-duct."

The sliding of a cowl between its "direct jet" and "reverse jet" positions is conventionally provided by a plurality of actuators, of the electro-mechanical type (for example: worm screw actuated by an electric motor and displacing a nut) or of the hydraulic type (cylinders actuated by oil under pressure).

Typically, there are four or six actuators, namely respectively two or three actuators distributed over each half of the thrust reverser, on either side of the suspension mast.

The actuating elements are mounted on an assembly of parts forming the fixed structure. The positioning defects inherent to the assembly of each part of the fixed structure lead to geometric dispersions and therefore a misalignment of the axial positioning, that's to say along the axis of the nacelle, at the level of the anchoring position of each actuating element. This misalignment of the positioning of the actuating elements may cause malfunctions during the displacement of the cowl.

The positioning defects inherent to the assembly of each part of the fixed structure may further lead to a misalignment of the actuating elements, and cause malfunctions during the displacement of the cowl.

In order to overcome the geometric dispersions due to these positioning defects, wedges have been used at the level of the anchoring point of the actuating element on the cowl, in order to axially align the actuating elements.

Nonetheless, in case of need for maintenance on the cowl, or in case of change of the latter, the thickness of these wedges should be manually readjusted. These readjustments are time-consuming, which can lead to delays in flights and have a significant economic impact.

Furthermore, the presence of these wedges leads to an overweight at the level of the nacelle but also within the aircraft. Indeed, it is necessary that the aircraft transports these wedges in flight in order to be able to perform maintenance operations on the cowl if necessary. The transport of these wedges implies a greater weight of the aircraft, having consequences in terms of energy consumption and therefore an economic impact.

It is also known to use actuating elements adjustable in length. Nonetheless, such actuating elements are expensive and their adjustment must also be manually made in case of maintenance operations on the cowl.

SUMMARY

The present disclosure provides a thrust reverser for a device for receiving a propulsion element, such as a turbojet engine nacelle, the thrust reverser comprising:

a fixed structure, including an element for diverting at least part of an air flow intended to circulate in the nacelle;

a cowl movable in translation, capable of occupying a closed position in which the cowl covers the element for diverting the air flow and an open position in which the cowl releases the element for diverting the air flow;

at least one displacement actuator configured to displace the cowl between the open position and the closed position, the at least one displacement actuator comprising a fixed portion, configured to be attached to the fixed structure in a first anchoring position and a movable portion, configured to be attached to the cowl in a second anchoring position; and an adjustment device configured to adjust the first anchoring position.

Thanks to these arrangements, the geometric dispersions due to the positioning defects inherent to the assembly of a plurality of parts forming the fixed structure are compensated. The correct axial positioning of the displacement actuator relative to the fixed structure is provided. The alignment of the displacement actuators relative to each other is also provided.

Furthermore, with these arrangements adjustments may not be needed between the at least one actuating element and the cowl. These adjustments are made once, at the level of the fixed structure. The duration of the maintenance operations on the cowl is thus limited.

These arrangements allow also reducing the effort exerted on the at least one displacement actuator, or on a synchronization system of the displacement actuators, if there are several ones, and thus slowing down the wear thereof. The synchronization system may for example comprise a torsion cable connected to the different actuators.

According to optional features of the thrust reverser according to the present disclosure:

the displacement actuator comprises a displacement axis substantially parallel to the movement of the cowl between the closed position and the open position;

the displacement actuator may be attached to the fixed structure via an interface such as a gimbal joint or a ball joint; and the adjustment device comprises a positioning element configured to position the first anchoring point based on an adjustment measured value. Thus, the geometric dispersions due to the positioning defects inherent to the assembly of the parts of the fixed structure are compensated. Adjustment measured value means the value of the positioning defect to be compensated by the adjustment device. The positioning defect to be compensated is induced by the mounting of parts forming the fixed structure.

In another optional feature, the positioning element comprises an external surface configured to cooperate with the fixed structure, and an internal surface configured to cooperate with the at least one displacement actuator, the external surface being defined around an external central axis, the internal surface being defined around an internal central axis, the internal central axis being offset relative to the external central axis by an offset distance. Thus, the geometric dispersions due to the positioning defects inherent to the assembly of the parts of the fixed structure are compensated by a simple and lightweight device.

According to further optional features of the thrust reverser according to the present disclosure:

the positioning element comprises an eccentric ring;
the internal surface is circular;
the external surface is circular; and
the offset distance is measured along the displacement axis of the at least one displacement actuator.

According to one form of the present disclosure, the offset distance can also be measured along a transverse axis, substantially perpendicular to the displacement axis and to the external central axis. Thus, the adjustment device is configured to compensate for the positioning defect transverse to the displacement movement.

The internal central axis may also be offset along a component of the displacement axis and the transverse axis.

In other various forms of the present disclosure, the offset distance is negative, positive or zero relative to the external central axis;

the absolute value of the offset distance is comprised between 0 and 1.2 millimeters;

the geometric characteristics of the positioning element are determined based on the adjustment measured value; and the adjustment device comprises a locking element configured to inhibit movement of the adjustment device relative to the fixed structure and to the fixed portion of the at least one displacement actuator. Thanks to these arrangements, the adjustment of the first anchoring position is maintained and reduces the risk of malfunction in flight.

In further variations of the present disclosure, the fixed structure comprises a cooperation portion configured to cooperate with the locking element of the adjustment device;

the locking element is configured to lock the position of the positioning element;

the locking element comprises a finger;
the finger is made integral with the positioning element;
the finger comprises an orifice;
the orifice may be tapped;
the locking element further comprises a rod configured to be inserted into the orifice;
the rod comprises a thread;
the fixed structure comprises an opening at the level of the cooperation portion;
the rod is configured to be inserted into the opening;
the opening is tapped;
the rod is configured to be screwed into the opening so as to block the movements of the adjustment device;
the cooperation area extends at an angle comprised between 0 and 180; and
the cooperation area comprises a slot configured to receive the locking element.

According to another form of the present disclosure, the locking element is configured to inhibit movement of the adjustment device relative to the fixed structure and to the fixed portion of the at least one displacement actuator by different techniques well known to one skilled in the art, namely by screwing, by welding, by gluing, by deformation of the eccentric ring, by embedding with visual positioning indicator, by broaching the ring, by key, by riveting, by sheet folding on the side of the ring.

According to one form, the adjustment device is capable of occupying a plurality of adjustment positions relative to the fixed structure and to the fixed portion of the at least one actuating element. Thus, the adjustment device is capable of adapting to different fixed structures. Indeed, the internal central axis being offset relative to the external central axis, if it is displaced in rotation, the distance between the internal surface and the external surface varies and allows positioning the first anchoring position based on the adjustment measured value;

An adjustment position among the plurality of adjustment positions may be selected based on the adjustment measured value.

An adjustment position among the plurality of adjustment positions may be selected based on the offset value.

In other variations of the present disclosure, the adjustment device is movable in rotation between the plurality of adjustment positions;

the fixed structure comprises a plurality of indexing elements configured to cooperate with the locking element, each indexing element among the plurality of indexing elements corresponding to an adjustment position among the plurality of adjustment positions;

the offset distance is substantially equal to the adjustment measured value; and the thrust reverser comprises an adjustment device in accordance with the above-mentioned features configured to adjust the second anchoring position, in addition to the adjustment of the first anchoring position.

The present disclosure also relates to a nacelle for a turbojet engine comprising a thrust reverser in accordance with any one of the aforementioned features.

The present disclosure further relates to a use of an adjustment element in a thrust reverser for a device for receiving a propulsion element, such as a turbojet engine nacelle, the thrust reverser comprising:

a fixed structure, including an element for diverting at least part of an air flow intended to circulate in the nacelle;

a cowl movable in translation, capable of occupying a closed position in which the cowl covers the element for diverting the air flow, thereby providing the aerodynamic continuity of the nacelle, and an open position in which the cowl releases the element for diverting the air flow; and at least one displacement actuator configured to displace the cowl between the open position and the closed position, each displacement actuator comprising a fixed portion, configured to be attached to the fixed structure in a first anchoring position and a movable portion, configured to be attached to the cowl in a second anchoring position, the adjustment device being used to adjust the first anchoring position.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

In all of these figures, identical or similar reference numerals refer to identical or similar members or sets of members.

Figure 1:
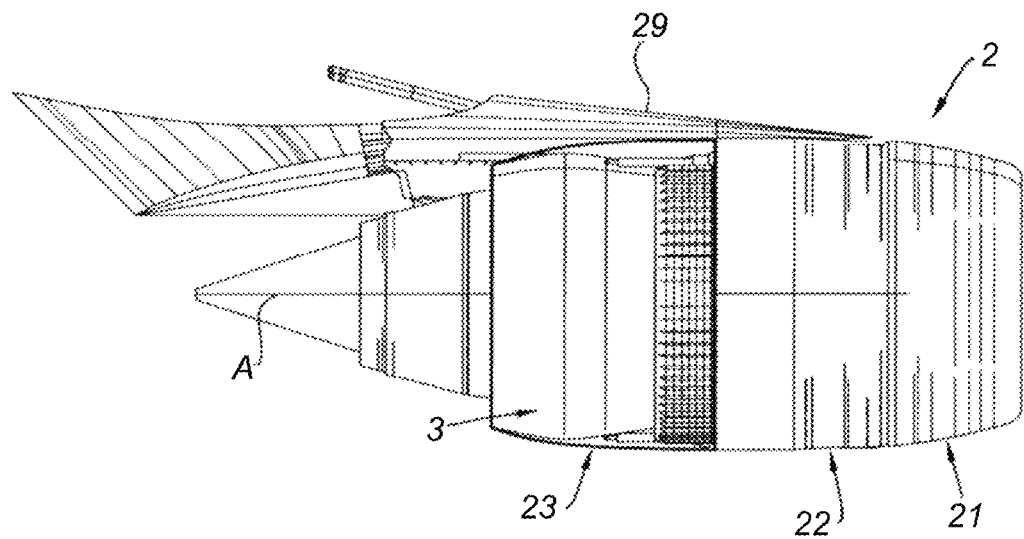
FIG. 1 is a schematic overall representation of a turbojet engine nacelle having a thrust reverser, whose interior is viewed in shadow according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
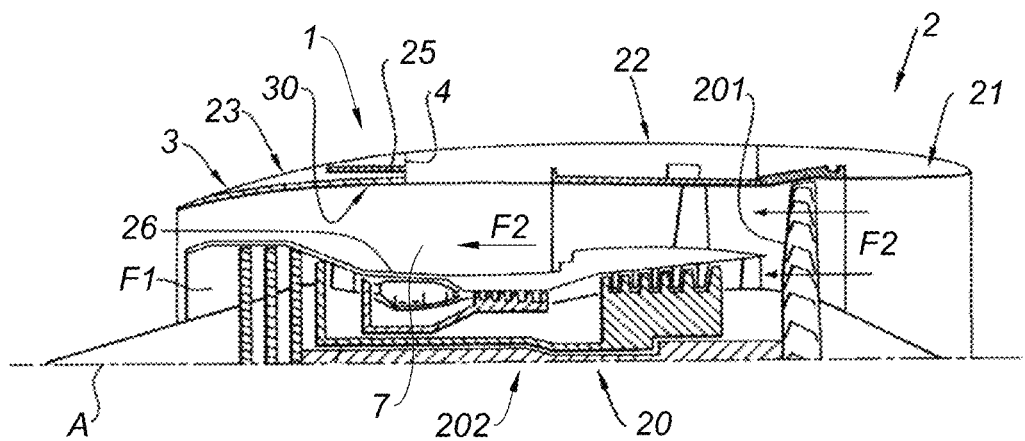
FIG. 2 is a schematic representation in a longitudinal half-section of the nacelle of FIG. 1.

In FIGS. 1 and 2, there is represented a nacelle 2 intended to constitute a tubular housing for a turbojet engine 20, for example a bypass turbojet engine. The nacelle 2 serves to channel a flow of hot gases F1 and a cold air flow F2 generated by the turbojet engine 20.

The nacelle 1 is intended to be suspended from a mast 29. The mast 29 itself is fixed under a wing of an aircraft.

As indicated above, the nacelle 2 comprises an upstream portion 21 forming an air inlet, a median portion 22 and a downstream portion 23. The downstream portion 23 surrounds the turbojet engine 20. The turbojet engine 20 comprises a fan 201 and a body 202. The fan 201 is disposed at the level of the median portion 22, and the body 202 is disposed at the level of the downstream portion.

Figure 3:
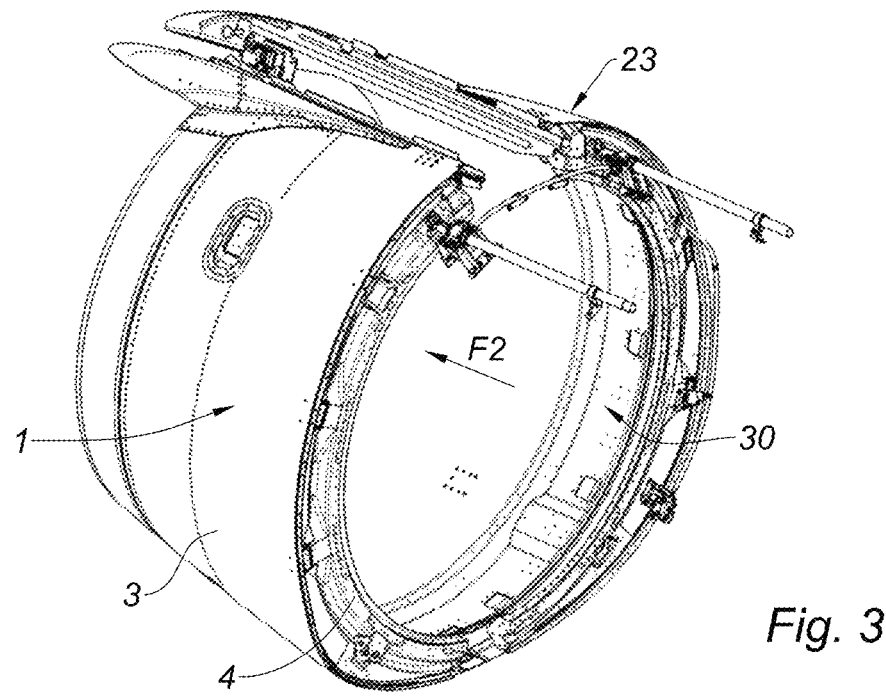
FIG. 3 is a perspective view of a thrust reverser.
Figure 4:
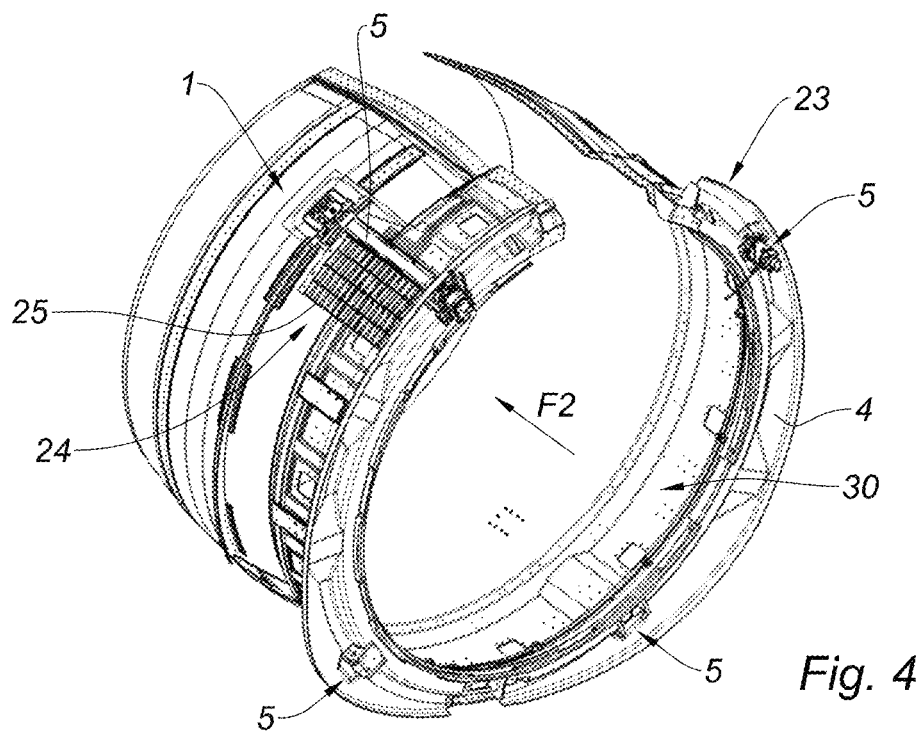
FIG. 4 is a perspective view of a thrust reverser.
Figure 5:
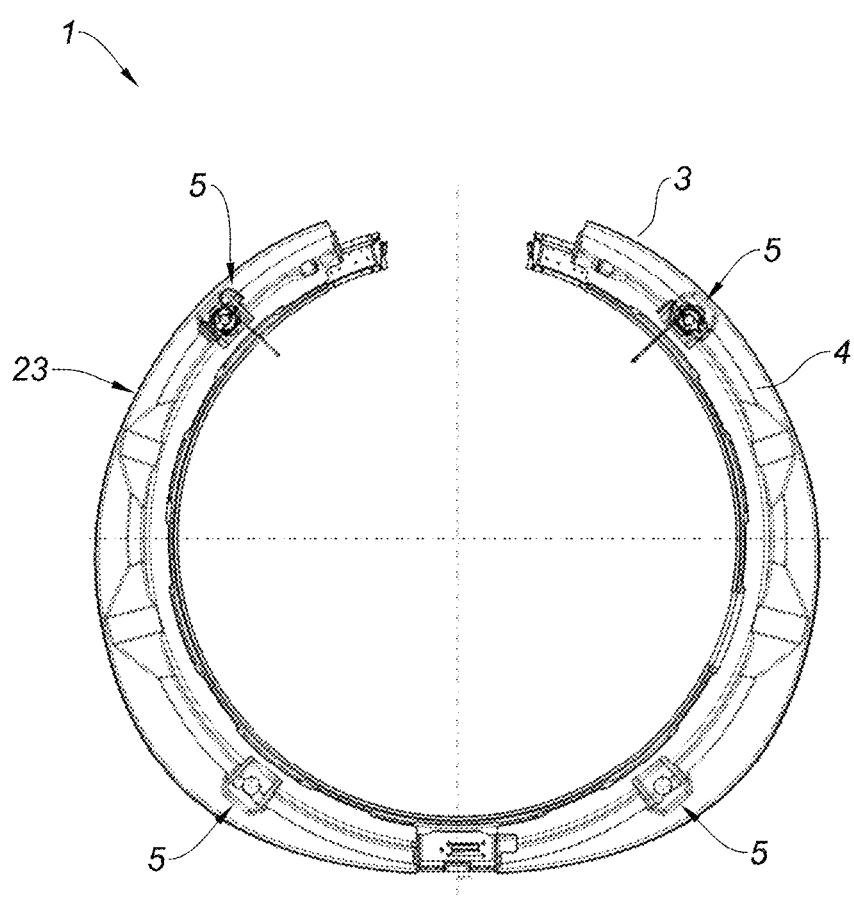
FIG. 5 illustrates a front view of the thrust reverser of FIGS. 3 and 4.

The downstream portion 23, represented in FIGS. 3, 4 and 5, comprises an outer structure 30 including a thrust reverser 1 and an inner fairing structure 26 of the engine 3 of the turbojet engine 20 defining with the outer structure 30 a flow path 7 of the air flow F2, in the case of the bypass turbojet engine 20 nacelle 2 as presented herein.

Figure 6:
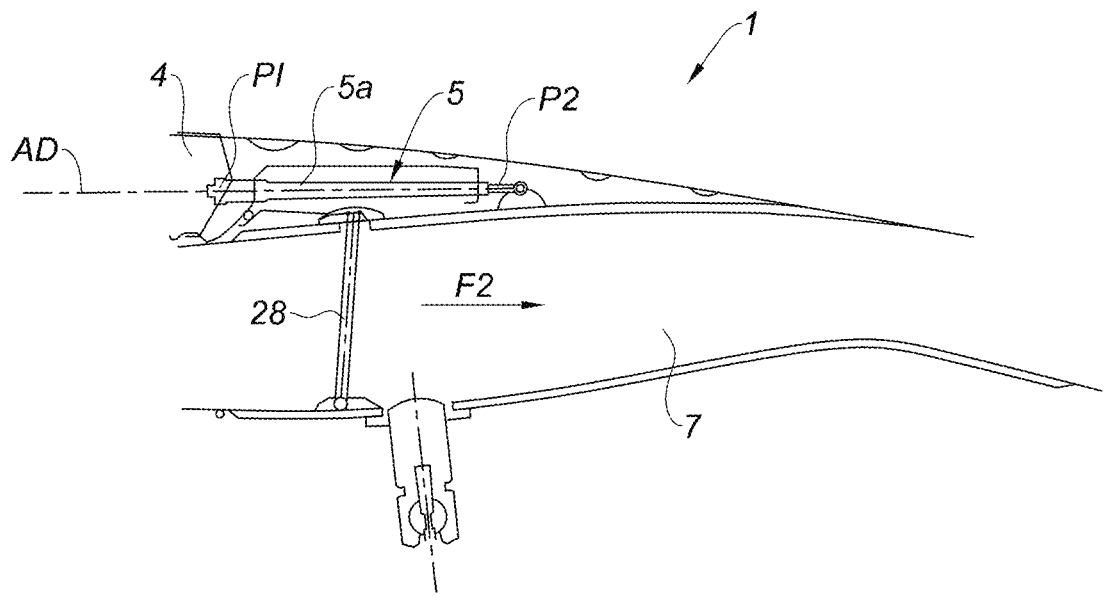
FIG. 6 is a sectional view of a thrust reverser in which the cowl is in an open position.
Figure 7:
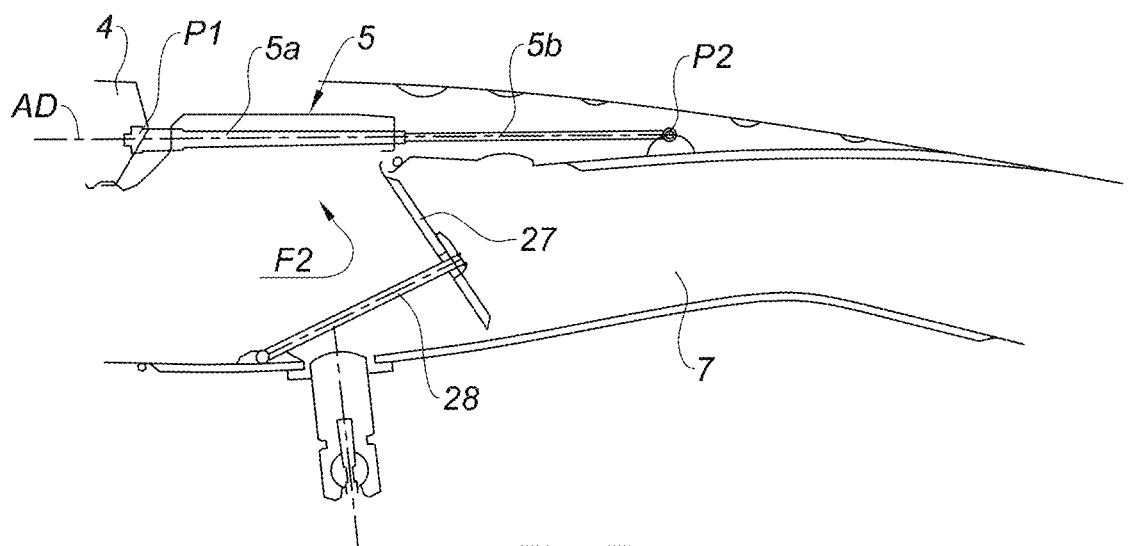
FIG. 7 is a sectional view of a thrust reverser in which the cowl is in a closed position.

The thrust reverser 1, more particularly represented in FIGS. 6 and 7, comprises a fixed structure 4 and a cowl 3, mounted on the fixed structure 4. The cowl 3 has an almost annular shape. The thrust reverser 1 further comprises a diverting element 24, herein cascade vanes 25 for diverting the air flow F2. The cascade vanes 25 are fastened to the fixed structure 4. Each of the cascade vanes 25 has a plurality of diverting blades.

The cowl 3 is movable in translation relative to the fixed structure 4 along a direction substantially parallel to the longitudinal axis A of the nacelle 2. The cowl 3 is capable of occupying a closed position (FIG. 6) in which it provides aerodynamic continuity of the lines of the downstream portion 23 of the nacelle 2 and covers the cascade vanes 25, and an open position (FIG. 7) in which it releases the cascade vanes 25. The cowl 3 switches from the closed position to the open position, and vice versa, by sliding along rails (not represented).

Displacing the cowl 3 from the closed position to the open position therefore releases an opening through which at least part of the air flow F2 can escape. Furthermore, the nacelle 2 comprises an obstruction element 27, and at least one connecting rod 28. The rod connecting 28 is connected to the obstruction element 27. The obstruction element 27 is configured to occupy a retracted position (FIG. 6), when the cowl 3 is in the closed position and an obstruction position (FIG. 7), when the cowl 3 is in the open position. The at least one portion of the air flow F2 is then directed towards the upstream portion 21 of the nacelle 2 by the cascade vanes 25, thus generating a counter-thrust contributing to the braking of the aircraft.

The thrust reverser 1 further comprises at least one displacement actuator 5, herein four displacement actuators 5 configured to displace the cowl 3 between the open position and the closed position. Each displacement actuator 5 comprises a fixed portion 5a, configured to be attached to the fixed structure 4 in a first anchoring position P1, and a movable portion 5b, configured to be attached to the cowl 3 in a second anchoring position P2.

Figure 8:
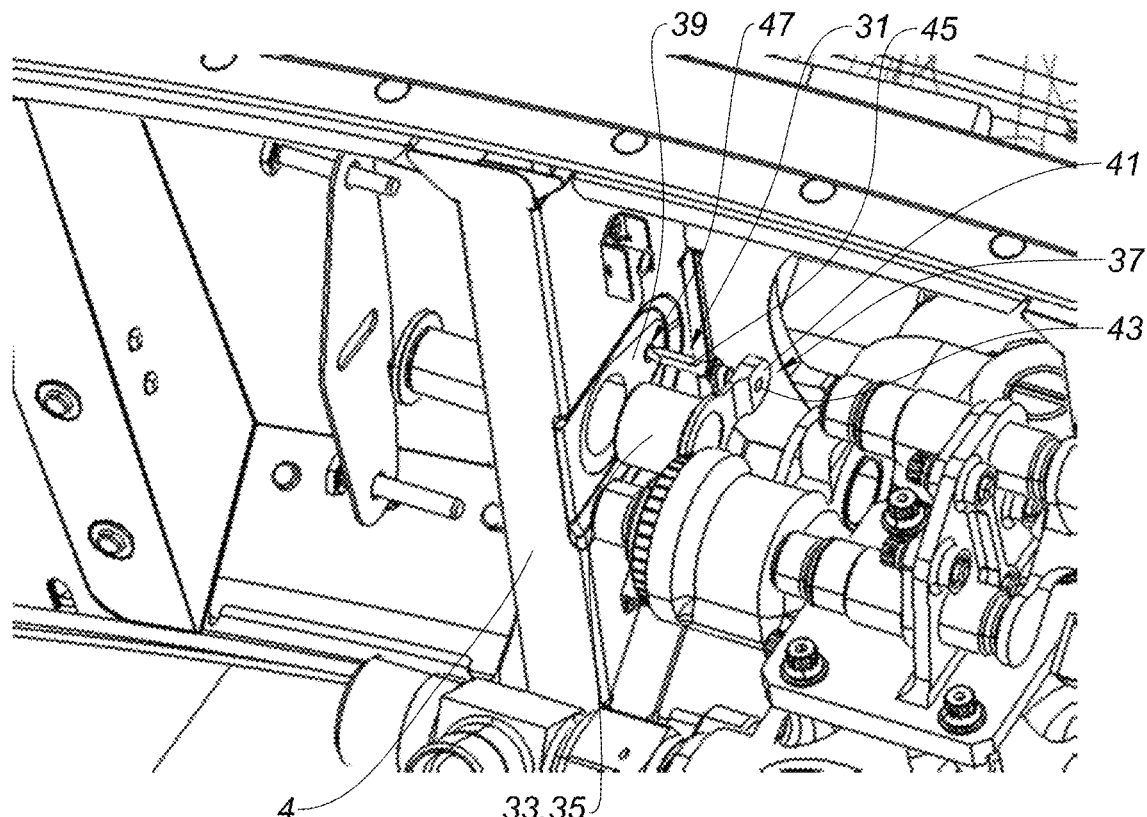
FIG. 8 represents an exploded view of the first anchoring position of the displacement actuator of the cowl.
Figure 9:
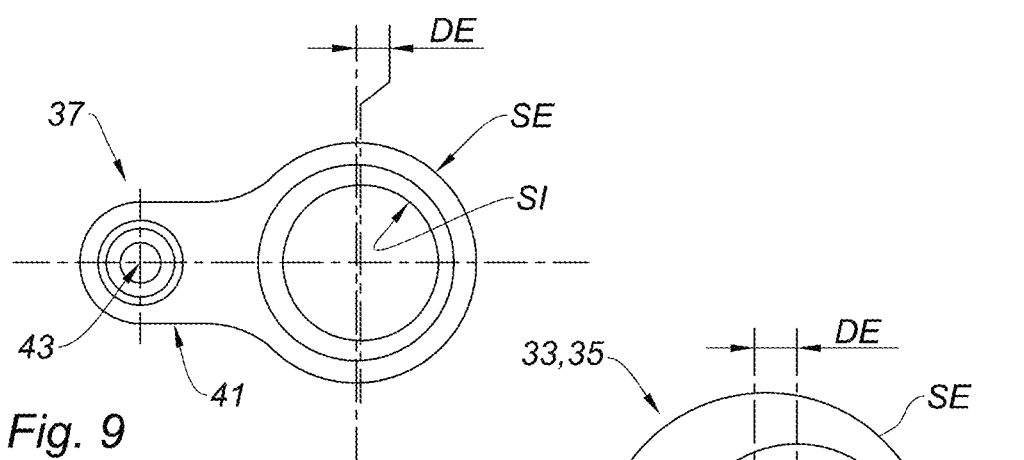
FIG. 9 represents a device for adjusting the first anchoring position of the displacement actuator of the cowl.

The thrust reverser 1 further comprises an adjustment device 31, represented in FIGS. 8 and 9 configured to adjust the first anchoring position P1.

Thus, the geometric dispersions due to the positioning defects inherent to the assembly of a plurality of parts forming the fixed structure are compensated. The correct axial positioning of the displacement actuator relative to the fixed structure is provided. The alignment of the displacement actuators 5 relative to each other is also provided.

Each of the displacement actuators 5 each comprises a displacement axis AD substantially parallel to the movement of the cowl 3 between the closed position and the open position and to the axis A of the nacelle 2.

The displacement actuators 5 may be attached to the fixed structure 4 via an interface such as a gimbal joint.

The adjustment device 31 comprises a positioning element 33 configured to position the first anchoring point P1 based on an adjustment measured value.

Adjustment measured value means the value of the positioning defect to be compensated by the adjustment device 31. The positioning defect to be compensated is induced by the mounting of parts forming the fixed structure 4.

Figure 10:
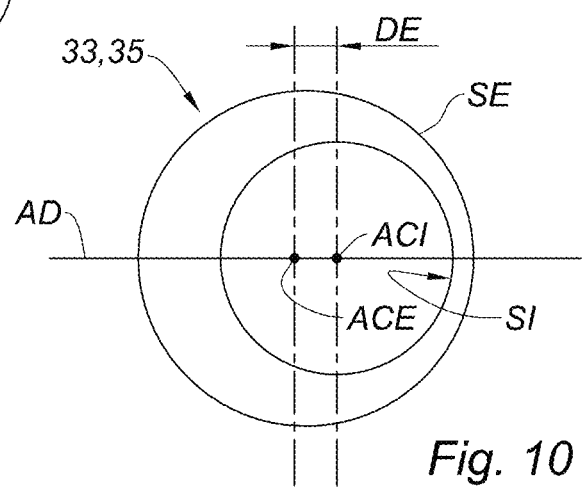
FIG. 10 represents a positioning element according to the present disclosure.

The positioning element 33 is more particularly represented in FIG. 10, and comprises an eccentric ring 35. The positioning element 33, and more particularly the eccentric ring 35, comprise an external surface SE configured to cooperate with the fixed structure 4. The positioning element 33, and more particularly the eccentric ring 35, further comprise an internal surface SI configured to cooperate with the displacement actuators 5. The external surface SE is defined around an external central axis ACE. The internal surface SI is defined around an internal central axis ACI. The internal central axis ACI is offset relative to the external central axis ACE by an offset distance DE.

The internal and external surfaces SI, SE are circular.

The offset distance DE is measured along the displacement axis AD of each displacement actuator 5. The offset distance DE may be negative, positive or zero relative to the external central axis ACE. The absolute value of the offset distance DE is comprised between 0 and 1.2 millimeters.

According to one form of the present disclosure, the offset distance DE may also be measured along a transverse axis substantially perpendicular to the displacement axis AD and to the external central axis ACE. Thus, the adjustment device 31 is configured to compensate for the positioning defect transverse to the displacement movement. The internal central axis ACI may also be eccentric along a component of the displacement axis AD and the transverse axis.

According to a first form of the present disclosure, the offset distance DE is substantially equal to the adjustment measured value.

The geometrical characteristics of the positioning element 33, in particular the offset distance DE, are therefore determined based on the adjustment measured value.

In this first form, the eccentric rings 35 are selected from a range of eccentric rings 35 for each fixed structure 4 and for each displacement actuator 5.

The adjustment device 31 further comprises a locking element 37 configured to inhibit the rotational movement of the adjustment device 31 relative to the fixed structure 4 and to the fixed portion 5a of each displacement actuator 5. The locking element 37 is configured to lock the position of the positioning element 33.

The fixed structure 4 comprises a cooperation portion 39 configured to cooperate with the locking element 37 of the adjustment device 31.

The cooperation portion 39 extends at an angle comprised between 0 and 180°.

According to one form of the present disclosure, the locking element 37 comprises a finger 41. The finger 41 is made integral with the eccentric ring 35. The finger 41 comprises an orifice 43. The orifice 43 may be tapped. The locking element 37 further comprises a rod 45 configured to be inserted into the orifice 43. The rod 45 comprises a thread. The fixed structure 4 comprises an opening 47 at the level of the cooperation portion 39. The rod 45 is configured to be inserted into the opening 47. The opening 47 is tapped. The rod 45 is configured to be screwed into the opening 47 so as to block the movements of the adjustment device 31.

According to other forms of the locking element 37, the locking element 37 is configured to inhibit movement of the adjustment device 31 relative to the fixed structure 4 and to the fixed portion 5a of each displacement actuator 5 by different techniques well known to one skilled in the art, namely by screwing, by welding, by gluing, by deformation of the eccentric ring, by embedding with visual positioning indicator, by broaching the ring, by key, by riveting, by sheet folding on the side of the ring.

According to the first form, the locking element 37 is configured to inhibit movement of the adjustment device 31 relative to the fixed structure 4 and to the fixed portion 5a of each displacement actuator 5 in a single position.

According to a second form, the adjustment device 31 is capable of occupying a plurality of adjustment positions relative to the fixed structure 4 and to the fixed portion 5a of each actuating element 5.

Thus, the adjustment device 31 is capable of adapting to different fixed structures 4. Indeed, the internal central axis ACI being offset relative to the external central axis ACE, if it is displaced in rotation, the distance between the internal surface SI and the external surface SE varies and allows positioning the first anchoring position P1 based on the adjustment measured value.

Hence, an adjustment position is selected among the plurality of adjustment positions based on the adjustment measured value and the offset distance.

The adjustment device 31 is movable in rotation between the plurality of adjustment positions.

According to a first variant of the second form, the cooperation portion 39 comprises a slot configured to receive the locking element.

According to a second variant of the second form, the fixed structure 4 comprises a plurality of indexing elements 47 configured to cooperate with the locking element 37, each indexing element 47 among the plurality of indexing elements 47 corresponding to an adjustment position among the plurality of adjustment positions.

Each indexing element 47 among the plurality of indexing elements 47 comprises an indexing opening 47. The indexing openings 47 are distributed over the cooperation portion 39.

According to another form of the thrust reverser, the adjustment device 31 can also be used to adjust the second anchoring position P2, in addition to the adjustment of the first anchoring position P1.

Of course, the present disclosure is not limited to the various forms described and represented, which are provided as illustrative and non-limiting examples.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

As used herein, the phrase at least one of A, B, and C should be construed to mean a logical (A OR B OR C), using a non-exclusive logical OR, and should not be construed to mean :2937 at least one of A, at least one of B, and at least one of C.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A thrust reverser of a turbojet engine nacelle, the thrust reverser comprising:
    a fixed structure including a diverting element for diverting at least part of an air flow that circulates in the nacelle;
    a cowl movable in translation between a closed position in which the cowl covers the diverting element and an open position in which the cowl releases the diverting element;
    at least one displacement actuator configured to displace the cowl between the open position and the closed position, the at least one displacement actuator comprising a fixed portion configured to be attached to the fixed structure in a first anchoring position and a movable portion configured to be attached to the cowl in a second anchoring position; and
    an adjustment device configured to adjust the first anchoring position of the fixed portion of the at least one displacement actuator such that a positioning defect induced by parts forming the fixed structure is compensated, wherein the adjustment device comprises a positioning element configured to position the first anchoring position based on an adjustment measured value, the positioning element comprises an external surface configured to cooperate with the fixed structure, and an internal surface configured to cooperate with the at least one displacement actuator, the external surface defined around an external central axis and the internal surface defined around an internal central axis that is offset relative to the external central axis by an offset distance, and the offset distance is substantially equal to the adjustment measured value.

2. The thrust reverser according to claim 1, wherein the positioning element comprises an eccentric ring.

3. The thrust reverser according to claim 1, wherein the adjustment device comprises a locking element configured to inhibit movement of the adjustment device relative to the fixed structure and the fixed portion of the at least one displacement actuator.

4. The thrust reverser according to claim 1, wherein the adjustment device is capable of occupying a plurality of adjustment positions relative to the fixed structure and the fixed portion of the at least one displacement actuator.

5. The thrust reverser according to claim 4, wherein the fixed structure comprises a plurality of indexing elements configured to cooperate with a locking element of the adjustment device, each indexing element among the plurality of indexing elements corresponding to an adjustment position among the plurality of adjustment positions.

6. A nacelle for a turbojet engine comprising a thrust reverser according to claim 1.

7. An adjustment device for a thrust reverser with a fixed structure including a diverting element for diverting at least part of an air flow that circulates in a turbojet engine nacelle, and a cowl movable in translation between a closed position in which the cowl covers the diverting element to provide aerodynamic continuity of the turbojet engine nacelle, and an open position in which the cowl releases the diverting element, the adjustment device comprising:
    at least one displacement actuator configured to displace the cowl between the open position and the closed position, each of the at least one displacement actuator comprising a fixed portion configured to be attached to the fixed structure in a first anchoring position and a movable portion configured to be attached to the cowl in a second anchoring position, and
    a positioning element configured to position the first anchoring position based on an adjustment measured value, the positioning element comprises an external surface configured to cooperate with the fixed structure, and an internal surface configured to cooperate with the at least one displacement actuator, the external surface defined around an external central axis and the internal surface defined around an internal central axis that is offset relative to the external central axis by an offset distance, and the offset distance is substantially equal to the adjustment measured value,
    wherein the adjustment device is configured to adjust the first anchoring position of the fixed portion of the at least one displacement actuator such that a positioning defect induced by parts forming the fixed structure is compensated.

* * * * *